US011852049B2

(12) United States Patent
Ishikawa et al.

(10) Patent No.: US 11,852,049 B2
(45) Date of Patent: Dec. 26, 2023

(54) ELECTRIC ACTUATOR

(71) Applicant: NTN CORPORATION, Osaka (JP)

(72) Inventors: Shintarou Ishikawa, Shizuoka (JP); Takahide Saito, Shizuoka (JP)

(73) Assignee: NTN CORPORATION, Osaka (JP)

( * ) Notice: Subject to any disclaimer, the term of this patent is extended or adjusted under 35 U.S.C. 154(b) by 122 days.

(21) Appl. No.: 17/435,882

(22) PCT Filed: Feb. 26, 2020

(86) PCT No.: PCT/JP2020/007744
§ 371 (c)(1),
(2) Date: Sep. 2, 2021

(87) PCT Pub. No.: WO2020/189200
PCT Pub. Date: Sep. 24, 2020

(65) Prior Publication Data
US 2022/0145783 A1 May 12, 2022

(30) Foreign Application Priority Data

Mar. 18, 2019 (JP) ................................ 2019-049763
Mar. 26, 2019 (JP) ................................ 2019-059054

(51) Int. Cl.
*F01L 1/352* (2006.01)
*F01L 1/344* (2006.01)
(Continued)

(52) U.S. Cl.
CPC .............. *F01L 1/344* (2013.01); *F01L 1/047* (2013.01); *F01L 1/352* (2013.01); *F16C 19/54* (2013.01);
(Continued)

(58) Field of Classification Search
CPC . F01L 1/344; F01L 1/047; F01L 1/352; F01L 2820/032; F01L 2013/103;
(Continued)

(56) References Cited

U.S. PATENT DOCUMENTS

2009/0139799 A1\* 6/2009 Tiwari ................ F16H 57/0431
184/6.12
2014/0076253 A1 3/2014 Kokubo et al.
(Continued)

FOREIGN PATENT DOCUMENTS

DE 4110195 A1 \* 10/1992 ................ F01L 1/34
EP 3 179 063 6/2017
(Continued)

OTHER PUBLICATIONS

DE-4110195-A1, English language machine translation (Year: 1992).\*
(Continued)

*Primary Examiner* — Wesley G Harris
(74) *Attorney, Agent, or Firm* — Wenderoth, Lind & Ponack, L.L.P.

(57) ABSTRACT

A differential device (5) of an electric actuator (1) includes a driving rotary body (2), a driven rotary body (3), and a planetary rotary body (52). A first speed reducer (5*a*) is formed between the planetary rotary body (52) and the driving rotary body (2). A second speed reducer (5*b*) is formed between the planetary rotary body (52) and the driven rotary body (3). The electric actuator (1) includes a first bearing (53) configured to support the planetary rotary body (52) on an inner side of a rotor (42) of an electric motor (4), and a second bearing (54) configured to support the planetary rotary body (52) at a position shifted in an axial direction so as to be prevented from overlapping the rotor (42). The second bearing (54) is formed of a deep-groove ball bearing.

20 Claims, 8 Drawing Sheets

(51) Int. Cl.
  *F01L 1/047* (2006.01)
  *H02K 7/08* (2006.01)
  *H02K 7/116* (2006.01)
  *H02K 21/16* (2006.01)
  *F16C 19/54* (2006.01)
  *F16H 57/021* (2012.01)

(52) U.S. Cl.
  CPC ........... *F16H 57/021* (2013.01); *H02K 7/083* (2013.01); *H02K 7/116* (2013.01); *H02K 21/16* (2013.01); *F01L 2820/032* (2013.01); *F16C 2380/27* (2013.01)

(58) Field of Classification Search
  CPC ..... F01L 1/46; F01L 2001/3521; F01L 1/356; F16H 1/32; F16H 57/021
  See application file for complete search history.

(56) References Cited

U.S. PATENT DOCUMENTS

| | | | |
|---|---|---|---|
| 2014/0224197 A1 | 8/2014 | Tadokoro et al. | |
| 2015/0059674 A1* | 3/2015 | Washino | F16D 57/002 188/267.2 |
| 2015/0075475 A1 | 3/2015 | Kawada et al. | |
| 2016/0123197 A1* | 5/2016 | Otsubo | F01M 9/10 123/90.15 |
| 2016/0326917 A1* | 11/2016 | Tadokoro | F01L 1/34 |
| 2017/0002699 A1 | 1/2017 | Kokubo et al. | |
| 2017/0167317 A1 | 6/2017 | Lee et al. | |
| 2018/0073656 A1* | 3/2018 | Miyachi | F01L 1/352 |

FOREIGN PATENT DOCUMENTS

| | | | |
|---|---|---|---|
| JP | 03-117725 | 5/1991 | |
| JP | 2005-201295 | 7/2005 | |
| JP | 2007-187191 | 7/2007 | |
| JP | 2012-197755 | 10/2012 | |
| JP | 2014-152766 | 8/2014 | |
| JP | 2016-211443 | 12/2016 | |
| JP | 2018-194151 | 12/2018 | |
| WO | WO-9500748 A1 * | 1/1995 | ............... F01L 1/02 |

OTHER PUBLICATIONS

Notice of Reasons for Refusal dated Oct. 28, 2022 issued in corresponding Japanese Patent Application No. 2019-049763 with English translation.
International Search Report dated Apr. 21, 2020 in International (PCT) Application No. PCT/JP2020/007744.
International Preliminary Report on Patentability and Written Opinion of the International Searching Authority dated Sep. 16, 2021 in International (PCT) Application No. PCT/JP2020/007744.
Extended European Search Report dated Nov. 11, 2022 in corresponding European Patent Application No. 20772554.0.

* cited by examiner

ELECTRIC ACTUATOR

TECHNICAL FIELD

The present invention relates to an electric actuator.

BACKGROUND ART

As an electric actuator which is capable of changing a rotation phase difference between an input side on which a drive force is input from an outside and an output side on which the input drive force is output, for example, there has been known an electric actuator to be used for a variable valve timing device configured to change an opening/closing timing of one of an intake valve and an exhaust valve of an engine for an automobile or both of the intake valve and the exhaust valve.

As one example, in Patent Literature 1, there is disclosed an electric actuator including an electric motor and a roller speed reducer configured to obtain a drive force from the electric motor and transmit a rotational force at reduced speed. In this electric actuator, when the roller speed reducer is not driven by the electric motor, an input-side member (for example, sprocket) and an output-side member (for example, cam shaft) rotate in synchronization with each other. When the roller speed reducer is driven by the electric motor, a rotation phase difference of the output-side member with respect to the input-side member is changed by the roller speed reducer, thereby adjusting an opening/closing timing of a valve.

As another example, in Patent Literature 2, there is disclosed an electric actuator including a cycloid speed reducer. This electric actuator includes an electric motor, a tubular driving rotary body (input rotary body), a driven rotary body (output rotary body), a tubular eccentric member configured to rotate integrally with a rotor of the electric motor, and a planetary rotary body (inner gear) arranged on an inner side of the eccentric member. The cycloid speed reducer of the electric actuator includes first outer tooth portions formed on an outer peripheral surface of the driving rotary body, second outer tooth portions formed on an outer peripheral surface of the driven rotary body, and first inner tooth portions and second inner tooth portions that are formed on an inner peripheral surface of the planetary rotary body and mesh with the first outer tooth portions and the second outer tooth portions, respectively.

An inner peripheral surface of the eccentric member located on an inner side of the rotor is arranged so as to be eccentric with respect to rotation axes (center axes) of the driving rotary body and the driven rotary body. By one needle roller bearing arranged on the inner side of the eccentric member, the planetary rotary body is supported so as to be rotatable with respect to the eccentric member. Further, the planetary rotary body is arranged on an inner periphery of the eccentric member, and thus is arranged so as to be eccentric with respect to the rotation axes of the driving rotary body and the driven rotary body.

The electric actuator having the configuration described above operates as follows. Under a state in which the electric motor is not energized and a drive force is not supplied from the electric motor to the speed reducer, when the driving rotary body is driven to rotate by a drive force from the outside, rotation of the driving rotary body is transmitted to the driven rotary body via the planetary rotary body so that the driven rotary body rotates in synchronization with the driving rotary body.

In contrast, when the electric motor is energized and the drive force is supplied from the electric motor to the speed reducer, as the rotor and the eccentric member integrally rotate, the planetary rotary body performs an eccentric motion with respect to the driving rotary body and the driven rotary body. With this, after every one rotation of the eccentric member, engagement positions of the first inner tooth portions and the first outer tooth portions are shifted in a circumferential direction by one tooth, and thus the planetary rotary body rotates while being reduced in speed with respect to the driving rotary body.

Further, with combination of a rotary motion and the above-mentioned eccentric motion of the planetary rotary body, in a relationship between the planetary rotary body and the driven rotary body, after every one rotation of the eccentric member, engagement positions of the second inner tooth portions and the second outer tooth portions are shifted in the circumferential direction by one tooth. With this, the driven rotary body rotates while being reduced in speed with respect to the planetary rotary body.

Further, when the cycloid speed reducer is driven by the electric motor, along with the rotary motion and the eccentric motion of the planetary rotary body, tooth surfaces of the inner tooth portions and tooth surfaces of the outer tooth portions move while mutually sliding (while performing a sliding motion), thereby transmitting power from the driving rotary body to the driven rotary body while reducing speed of the driven rotary body.

CITATION LIST

Patent Literature: [PTL 1] JP 2014-152766 A
[PTL 2] JP 2018-194151 A

SUMMARY OF INVENTION

Technical Problem

In the electric actuator as disclosed in Patent Literature 1, when it is intended to achieve a large speed reduction ratio by the roller speed reducer, a radial dimension or an axial dimension of the roller speed reducer is increased. Thus, there is a fear in that the electric actuator is increased in size.

In the electric actuator of Patent Literature 2, the cycloid speed reducer is supported by the needle roller bearing, and thus an increase in radial dimension of the electric actuator can be suppressed. However, the cycloid speed reducer is supported by only one needle roller bearing, and hence rigidity of the speed reducer is not ensured satisfactorily. In this electric actuator, the speed reducer includes two-stage gears formed between the first inner tooth portions and the first outer tooth portions, and between the second inner tooth portions and the second outer tooth portions. Thus, in the configuration in which the speed reducer is supported by only the needle roller bearing, due to the eccentric motion of the planetary rotary body given when the electric motor operates, a radial load is uneven. Accordingly, there has been a fear in that efficiency of the electric actuator is reduced.

In the related-art electric actuator adopting the cycloid speed reducer, power is transmitted along with sliding between the tooth surfaces of the inner tooth portions and the tooth surfaces of the outer tooth portions. Accordingly, there has been a fear in that efficiency of a differential device is reduced due to friction between the tooth surfaces.

The present invention has been made in view of the above-mentioned circumstances, and has a technical object to increase rigidity of a speed reducer and prevent reduction in efficiency of an electric actuator.

Solution to Problem

An electric actuator according to the present invention is made to solve the above-mentioned problems. The electric actuator comprises: a differential device comprising: a driving rotary body rotatable about a rotation axis; a planetary rotary body capable of rotating on its axis and revolving about the rotation axis; a driven rotary body rotatable about the rotation axis, the planetary rotary body meshing with the driving rotary body and the driven rotary body; a first speed reducer formed between the planetary rotary body and the driving rotary body; and a second speed reducer formed between the planetary rotary body and the driven rotary body, the first speed reducer and the second speed reducer having different speed reduction ratios; an electric motor comprising a rotor configured to drive the planetary rotary body; a first bearing configured to support the planetary rotary body on an inner side of the rotor; and a second bearing configured to support the planetary rotary body at a position shifted in an axial direction so as to be prevented from overlapping the rotor, wherein the second bearing is a deep-groove ball bearing.

With this configuration, the planetary rotary body forming the first speed reducer and the second speed reducer is supported by the first bearing and the second bearing, and the second bearing is formed of a deep-groove ball bearing, thereby being capable of increasing rigidity of the first speed reducer and the second speed reducer. Thus, skew of the planetary rotary body can be prevented from occurring, and reduction in efficiency of the electric actuator can be prevented.

The second bearing can support both of the first speed reducer and the second speed reducer. Thus, rigidity of the first speed reducer and the second speed reducer is increased, thereby being capable of effectively preventing reduction in efficiency of the electric actuator.

The differential device may comprise an eccentric member configured to rotate integrally with the rotor and change a rotation phase difference of the driven rotary body with respect to the driving rotary body, and the second bearing may comprise: an outer ring fixed to an inner periphery of the eccentric member; and an inner ring fixed to an outer periphery of the planetary rotary body.

The first bearing may be a needle roller bearing. Thus, a radial dimension of the electric actuator can be reduced as much as possible.

The electric actuator according to the present invention comprises: a sprocket provided to the driving rotary body; and a cam shaft provided to the driven rotary body. The electric actuator can be applied to a variable valve timing device configured to change an opening/closing timing of a valve by changing a rotation phase difference between the sprocket and the cam shaft.

The differential device may comprise inner tooth portions and outer tooth portions meshing with each other, and at least one of tooth surfaces of the inner tooth portions and tooth surfaces of the outer tooth portions may have a plurality of dimples.

With this configuration, the plurality of dimples are formed in one or both of the tooth surfaces of the inner tooth portions and the tooth surfaces of the outer tooth portions of the differential device, and oil reservoirs for a lubricating oil are formed in the dimples so that oil films are easily formed on the tooth surfaces. Thus, when the inner tooth portions and the outer tooth portions slide, through reduction in frictional force acting on the tooth surfaces, reduction in efficiency of the differential device (cycloid speed reducer) can be prevented.

The planetary rotary body may comprise inner tooth portions formed in an inner periphery thereof. The needle roller bearing may comprise rolling elements that roll in contact with the rotary body. The planetary rotary body may have an outer peripheral surface on which the rolling elements roll in contact with the outer peripheral surface. The outer peripheral surface may have a plurality of dimples.

With this configuration, the dimples are formed in the outer peripheral surface (raceway surface) of the planetary rotary body on which the rolling elements of the needle roller bearing roll in contact with the outer peripheral surface so that the oil film is easily formed by the lubricating oil on the outer peripheral surface. Thus, the outer peripheral surface is lubricated with the oil film, thereby being capable of preventing wear and seizure of the outer peripheral surface.

Advantageous Effects of Invention

According to the present invention, rigidity of the speed reducer can be increased, and reduction in efficiency of the electric actuator can be prevented.

DESCRIPTION OF EMBODIMENTS

Now, description is made of a mode for carrying out the present invention with reference to the accompanying drawings. In the respective drawings for illustrating the present invention, components such as members and component parts having the same functions or shapes are denoted by the same reference symbols as long as the components can be distinguished, and description thereof is therefore omitted after the description is made once.

Figure 1:
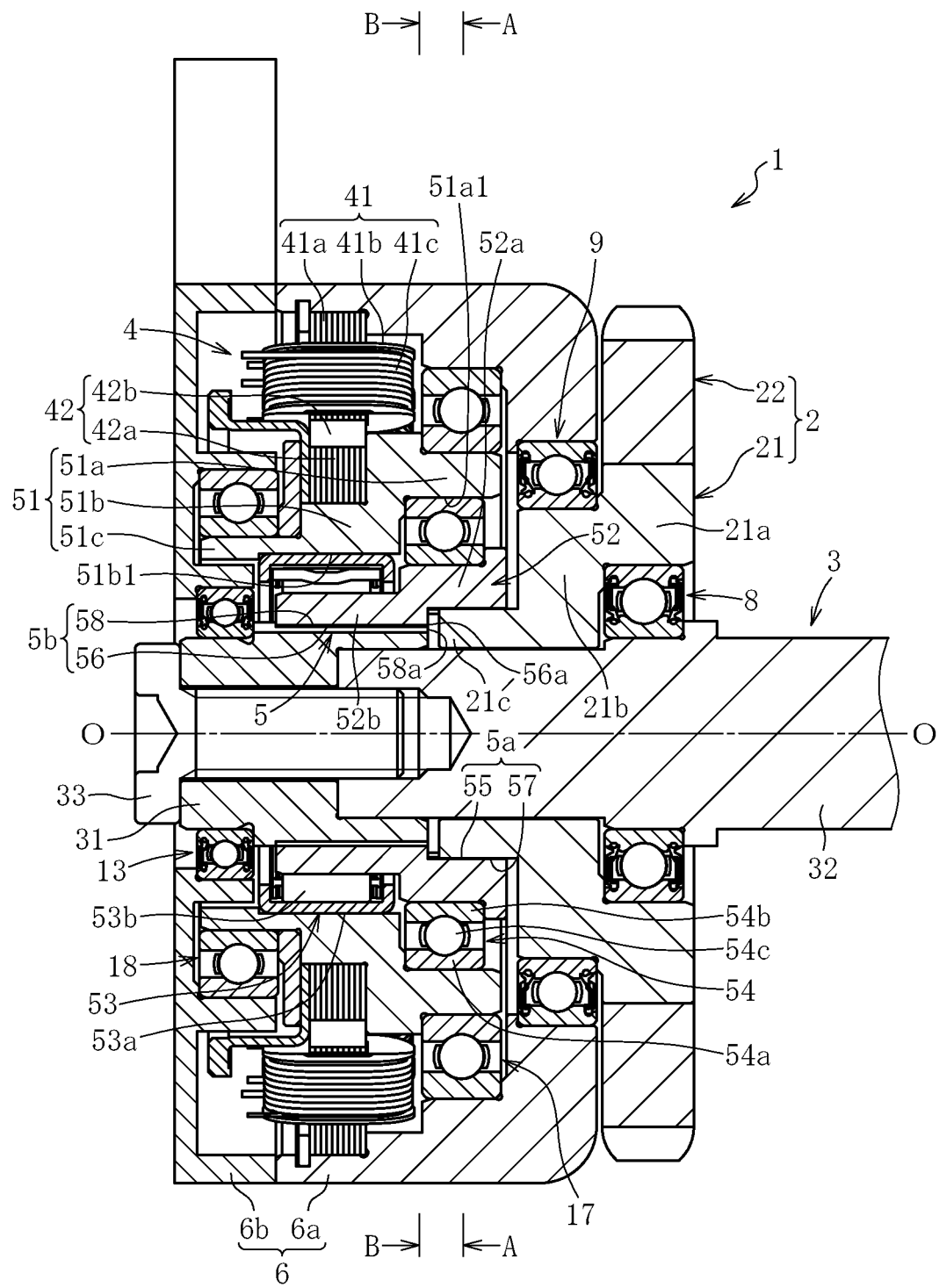
FIG. 1 is a sectional view for illustrating an electric actuator according to the present invention.
Figure 2:
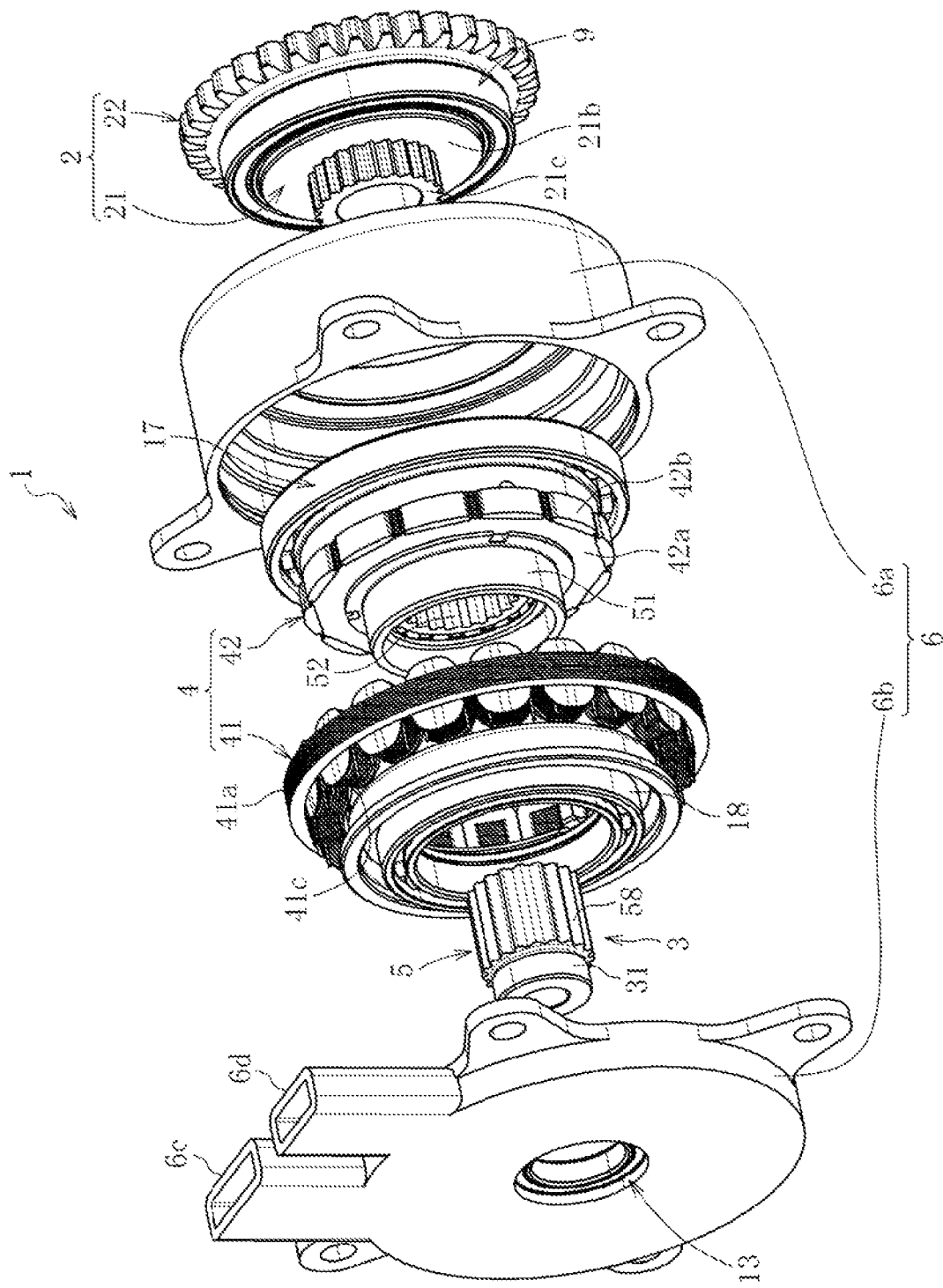
FIG. 2 is an exploded perspective view for illustrating the electric actuator.
Figure 3:
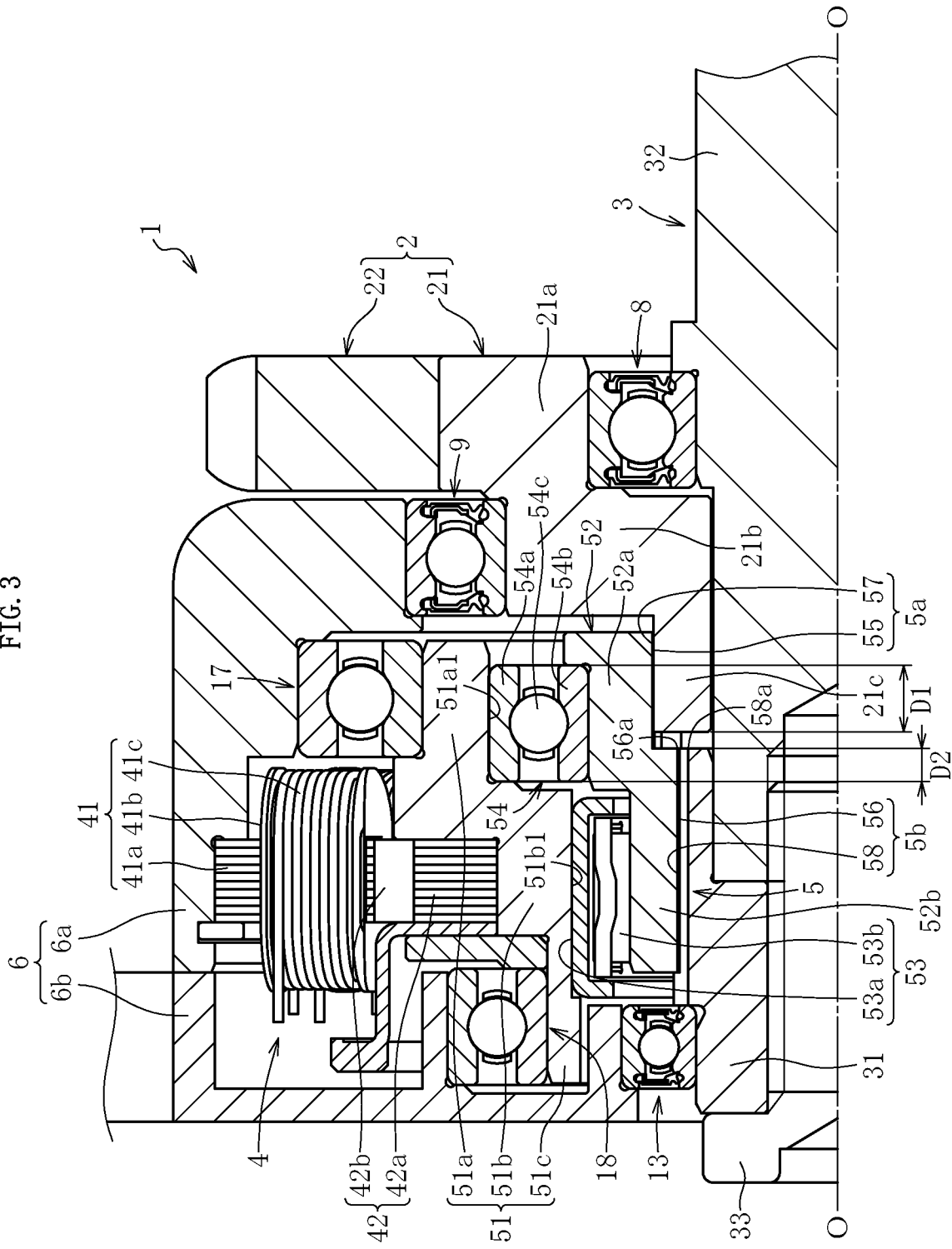
FIG. 3 is an enlarged sectional view for illustrating a main part of the electric actuator.

FIG. 1 is a longitudinal sectional view for illustrating an electric actuator according to one embodiment of the present invention. FIG. 2 is an exploded perspective view for illustrating the electric actuator. FIG. 3 is an enlarged sectional view for illustrating a main part of the electric actuator. The electric actuator according to this embodiment is used as, for example, a variable valve timing device of an engine (drive source), but the present invention is not limited to this application.

As illustrated in FIG. 1 to FIG. 3, an electric actuator 1 comprises, as main components, a driving rotary body 2, a driven rotary body 3, an electric motor 4, a differential device 5, and a casing 6 accommodating those components.

The driving rotary body 2 has, as a whole, a cylindrical shape that is open at both ends thereof in an axial direction, and comprises a main body 21 and a sprocket 22 that is a portion to which a drive force is input from the engine. Both of the main body 21 and the sprocket 22 are arranged coaxially on a rotation axis O. Thus, the main body 21 and the sprocket 22 are integrally rotated about the rotation axis O by the drive force input from the engine.

The main body 21 comprises a first tubular portion 21a, a second tubular portion 21b, and a third tubular portion 21c. The first tubular portion 21a has the sprocket 22 provided thereon. The second tubular portion 21b is supported by the casing 6. The third tubular portion 21c functions as a part of the differential device 5. The sprocket 22 is provided on the first tubular portion 21a of the main body 21 so as to be capable of transmitting torque, and is driven to rotate by the drive force transmitted from the engine via a chain.

The driven rotary body 3 is a member configured to output the drive force transmitted from the driving rotary body 2, and comprises a cylindrical main body 31 and a cam shaft 32. The cam shaft 32 comprises one or a plurality of cams (not shown), and is configured to drive at least one of an intake valve and an exhaust valve of the engine. The main body 31 and the cam shaft 32 are arranged coaxially on the rotation axis O, and are coupled to each other with a center bolt 33. With this configuration, the main body 31 and the cam shaft 32 are integrally rotated about the rotation axis O.

A bearing 8 is arranged between an outer peripheral surface of the cam shaft 32 and an inner peripheral surface of the first tubular portion 21a of the main body 21 of the driving rotary body 2. A bearing 9 is arranged between an outer peripheral surface of the second tubular portion 21b of the main body 21 of the driving rotary body 2 and the casing 6. The bearings 8 and 9 allow relative rotation between the driving rotary body 2 and the driven rotary body 3. Each of the bearings 8 and 9 is formed of a rolling bearing, but the present invention is not limited thereto. Each of the bearings 8 and 9 may be formed of a bearing of another type such as a sliding bearing.

For convenience of assembly, the casing 6 is divided into a bottomed cylindrical casing main body 6a and a cover portion 6b. The casing main body 6a and the cover portion 6b are integrated to each other through use of fastening means such as a bolt. The cover portion 6b comprises tubular protrusions 6c and 6d (see FIG. 2) configured to draw out a power feeding wire for feeding power to the electric motor 4 and a signal line connected to a rotation number detection sensor (not shown) configured to detect a rotation number of the electric motor 4 to the outside. A bearing 13 is arranged between an inner peripheral surface of the cover portion 6b of the casing 6 and an outer peripheral surface of the main body 31 of the driven rotary body 3.

The electric motor 4 is a radial gap type motor comprising a stator 41 and a rotor 42. The stator 41 is fixed to the casing main body 6a. The rotor 42 is arranged so as to be opposed to an inner side of the stator 41 in a radial direction through a gap. The stator 41 comprises a stator core 41a, bobbins 41b, and stator coils 41c. The stator core 41a is formed of a plurality of electromagnetic steel sheets laminated in the axial direction. The bobbins 41b are mounted to the stator core 41a and made of an insulating material. The stator coils 41c are wound around the bobbins 41b. The rotor 42 comprises an annular rotor core (rotor inner) 42a and a plurality of magnets 42b mounted to the rotor core 42a. The electric motor 4 is configured to rotate the rotor 42 about the rotation axis O by an exciting force acting between the stator 41 and the rotor 42.

The differential device 5 comprises, as main components, the main body 21 of the driving rotary body 2, the main body 31 of the driven rotary body 3, an eccentric member 51, a planetary rotary body 52, a first bearing 53, and a second bearing 54. The eccentric member 51 is configured to rotate integrally with the rotor 42. The planetary rotary body 52 is arranged on an inner periphery of the eccentric member 51. The first bearing 53 and the second bearing 54 are arranged between the eccentric member 51 and the planetary rotary body 52. A lubricating oil is filled into the casing 6, and the lubricating oil is fed to the differential device 5.

The eccentric member 51 has, as a whole, a cylindrical shape that is open at both ends thereof in the axial direction, and integrally comprises a large-diameter tubular portion 51a, a medium-diameter tubular portion 51b having a diameter smaller than that of the large-diameter tubular portion 51a, and a small-diameter tubular portion 51c having a diameter smaller than that of the medium-diameter tubular portion 51b.

The large-diameter tubular portion 51a protrudes from the medium-diameter tubular portion 51b in the axial direction so as to be prevented from overlapping the rotor core 42a. The large-diameter tubular portion 51a is supported on the casing main body 6a of the casing 6 through intermediation of a bearing 17 so as to be freely rotatable. The medium-diameter tubular portion 51b is fixed to an inner periphery of the rotor core 42a so as to overlap the rotor core 42a in the axial direction. The small-diameter tubular portion 51c protrudes from the medium-diameter tubular portion 51b in the axial direction (to a side opposite to the large-diameter tubular portion 51a) so as to be prevented from overlapping the rotor core 42a. The small-diameter tubular portion 51c is supported on the cover portion 6b of the casing 6 through intermediation of a bearing 18 so as to be freely rotatable.

An outer peripheral surface of the large-diameter tubular portion 51a, an outer peripheral surface of the medium-diameter tubular portion 51b, and an outer peripheral surface of the small-diameter tubular portion 51c are each a cylindrical surface formed so as to be coaxial with the rotation axis O. An eccentric inner peripheral surface 51a1 is formed into a cylindrical surface on an inner peripheral surface of the large-diameter tubular portion 51a of the eccentric member 51 so as to be eccentric with respect to the rotation axis O. Further, an eccentric inner peripheral surface 51b1 is formed into a cylindrical surface on an inner peripheral surface of the medium-diameter tubular portion 51b of the eccentric member 51 so as to be eccentric with respect to the rotation axis O. The large-diameter tubular portion 51a and the medium-diameter tubular portion 51b of the eccentric member 51 each comprise a thick portion and a thin portion in a relationship between the outer peripheral surface and the eccentric inner peripheral surface 51a1 of the large-diameter tubular portion 51a and a relationship between the outer peripheral surface and the eccentric inner peripheral surface 51b1 of the medium-diameter tubular portion 51b.

The planetary rotary body 52 has, as a whole, a cylindrical shape that is open at both ends thereof in the axial direction, and comprises a large-diameter tubular portion 52a and a small-diameter tubular portion 52b. First inner tooth portions 55 are formed on an inner periphery of the large-diameter tubular portion 52a, and second inner tooth portions 56 are formed on an inner periphery of the small-diameter tubular portion 52b. Both of the first inner tooth portions 55 and the second inner tooth portions 56 are formed of a plurality of teeth that trace out a curve (for example, trochoid curve) in cross section in the radial direction. The first inner tooth portions 55 and the second inner tooth portions 56 are formed at positions shifted from each other in the axial direction. A pitch circle diameter of the second inner tooth portions 56 is smaller than a pitch circle diameter of the first inner tooth portions 55. Further, the number of teeth of the second inner tooth portions 56 is smaller than the number of teeth of the first inner tooth portions 55.

An end portion 56a of each of the second inner tooth portions 56 on the first inner tooth portion 55 side in a tooth width direction is formed so as to overlap the outer peripheral surface of the large-diameter tubular portion 52a of the planetary rotary body 52 in the axial direction. In other words, a part (end portion 56a) of each of the second inner tooth portions 56 is formed so as to overlap the second bearing 54 in the axial direction (tooth width direction).

First outer tooth portions 57 configured to mesh with the first inner tooth portions 55 are formed on an outer peripheral surface of the third tubular portion 21c of the main body 21 of the driving rotary body 2. Further, second outer tooth portions 58 configured to mesh with the second inner tooth portions 56 are formed on the outer peripheral surface of the main body 31 of the driven rotary body 3. Both of the first outer tooth portions 57 and the second outer tooth portions 58 are formed of a plurality of teeth that trace out a curve (for example, trochoid curve) in cross section in the radial direction. A pitch circle diameter of the second outer tooth portions 58 is smaller than a pitch circle diameter of the first outer tooth portions 57, and the number of teeth of the second outer tooth portions 58 is smaller than the number of teeth of the first outer tooth portions 57.

One end portion 58a of each of the second outer tooth portions 58 in the tooth width direction is arranged so as to overlap the outer peripheral surface of the large-diameter tubular portion 52a of the planetary rotary body 52 in the axial direction. In other words, a part (end portion 58a) of each of the second outer tooth portions 58 is formed so as to overlap the second bearing 54 in the axial direction (tooth width direction).

The number of teeth of the first outer tooth portions 57 is smaller, preferably by one, than the number of teeth of the first inner tooth portions 55 meshing with the first outer tooth portions 57. Similarly, the number of teeth of the second outer tooth portions 58 is smaller, preferably by one, than the number of teeth of the second inner tooth portions 56 meshing with the second outer tooth portions 58. As one example, in this embodiment, the number of teeth of the first inner tooth portions 55 is 24; the number of teeth of the second inner tooth portions 56 is 20; the number of teeth of the first outer tooth portions 57 is 23; and the number of teeth of the second outer tooth portions 58 is 19.

The first inner tooth portions 55 and the first outer tooth portions 57, which mesh with each other, form a first speed reducer 5a, and the second inner tooth portions 56 and the second outer tooth portions 58 form a second speed reducer 5b. Both of the first speed reducer 5a and the second speed reducer 5b are each a so-called cycloid speed reducer. The two speed reducers 5a and 5b have different speed reduction ratios. In this embodiment, the speed reduction ratio of the first speed reducer 5a is larger than the speed reduction ratio of the second speed reducer 5b. When the two speed reducers 5a and 5b have the different speed reduction ratios as described above, rotation of the camshaft 32 can be changed (in a differential manner) in accordance with an operation state of the electric motor 4.

Figure 4:
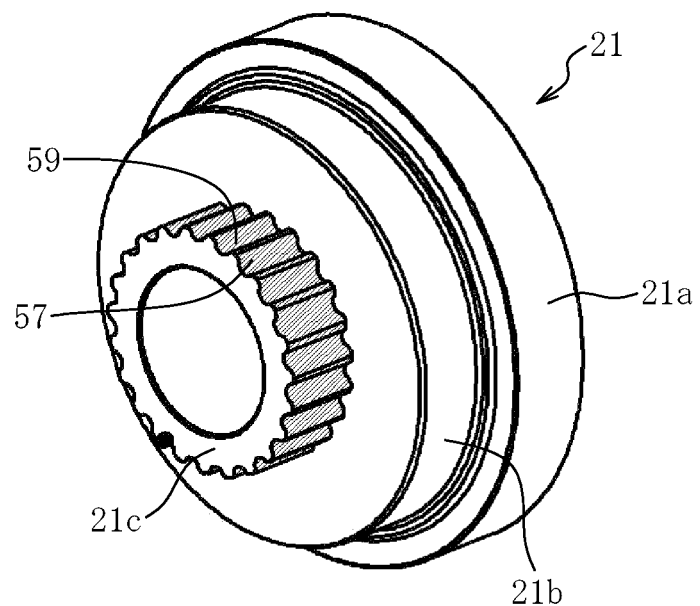
FIG. 4 is a perspective view for illustrating a driving rotary body (main body).
Figure 5:
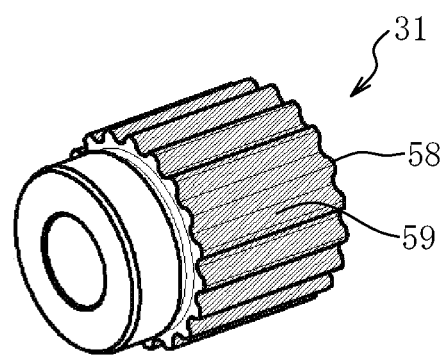
FIG. 5 is a perspective view for illustrating a driven rotary body (main body).
Figure 6:
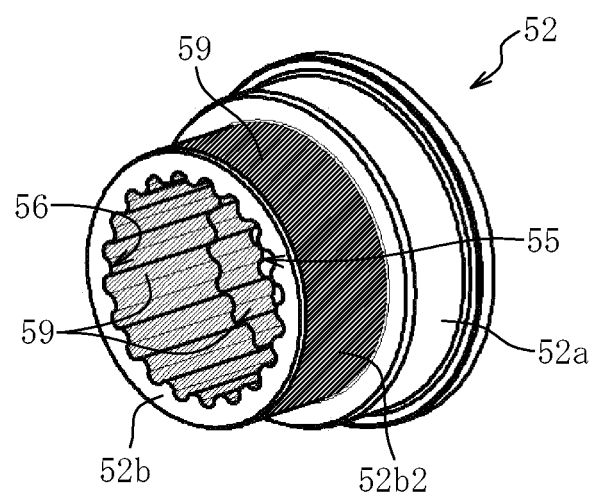
FIG. 6 is a perspective view for illustrating a planetary rotary body.
Figure 7:
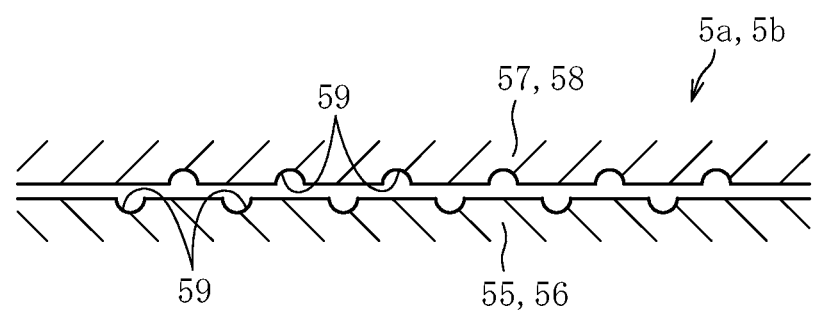
FIG. 7 is an enlarged sectional view for illustrating an inner tooth portion and an outer tooth portion.

FIG. 4 is a perspective view for illustrating the driving rotary body 2 (main body 21). FIG. 5 is a perspective view for illustrating the driven rotary body 3 (main body 31). FIG. 6 is a perspective view for illustrating the planetary rotary body 52. FIG. 7 is an enlarged sectional view for illustrating the inner tooth portion 55 and the outer tooth portion 57 of the speed reducer 5a or the inner tooth portion 56 and the outer tooth portion 58 of the speed reducer 5b.

As illustrated in FIG. 4 to FIG. 7, a plurality of dimples 59 (recessed portions) are formed in tooth surfaces of the first inner tooth portions 55 and the first outer tooth portions 57 forming the first speed reducer 5a and tooth surfaces of the second inner tooth portions 56 and the second outer tooth portions 58 forming the second speed reducer 5b. In FIG. 4 to FIG. 6, portions in which the dimples 59 are to be formed are illustrated by hatching. It is preferred that the dimples 59 be formed in an entire range of the tooth surfaces of the first inner tooth portions 55 and the first outer tooth portions 57 forming the first speed reducer 5a and an entire range of the tooth surfaces of the second inner tooth portions 56 and the second outer tooth portions 58 forming the second speed reducer 5b. However, a range of forming the dimples 59 is not limited to those ranges.

The dimples 59 are formed by performing, for example, shot blasting on the tooth surfaces. In shot blasting, through appropriate selection of, for example, kinds of materials to be blasted (with regard to particle diameter, composition, density, hardness, and strength), blasting speed, a blasting angle, and a blasting amount, the dimples 59 suitable for specifications of the electric actuator 1 can be formed on the tooth surfaces. A particle diameter of the material to be blasted is set to, for example, a range of from 0.05 mm to 0.6 mm, but is not limited to this range.

The first bearing 53 is arranged between the eccentric inner peripheral surface 51b1 of the eccentric member 51 and an outer peripheral surface of the small-diameter tubular portion 52b of the planetary rotary body 52. Thus, a center (P) of the outer peripheral surface and the inner peripheral surface of the planetary rotary body 52 is eccentric with respect to the rotation axis O. The planetary rotary body 52 is supported by the first bearing 53 so as to be relatively rotatable with respect to the eccentric member 51. The first bearing 53 is formed of, for example, a needle roller bearing comprising an outer ring 53a and rolling elements 53b (needle rollers). The outer ring 53a is fixed to the eccentric inner peripheral surface 51b1 of the medium-diameter tubular portion 51b of the eccentric member 51. The rolling elements 53b are held in contact with the outer peripheral surface (raceway surface) of the small-diameter tubular portion 51c of the planetary rotary body 52. An outer peripheral surface 52b2 of the small-diameter tubular portion 52b is formed as a raceway surface on which the rolling elements 53b of the first bearing 53 roll in contact with the raceway surface.

As illustrated in FIG. 6, the plurality of dimples 59 are formed in the outer peripheral surface 52b2 of the small-diameter tubular portion 52b of the planetary rotary body 52 by a method such as shot blasting. A dimension and a shape of each of the dimples 59 are the same as those formed in the tooth surfaces of the speed reducers 5a and 5b. It is preferred that the dimples 59 be formed in an entire range of the outer peripheral surface 52b2 of the planetary rotary body 52, but the range of forming the dimples 59 is not limited to this range.

The second bearing 54 is arranged at a position shifted from the first bearing 53 in the axial direction so as to be prevented from overlapping the inner periphery of the rotor core 42a of the electric motor 4. Specifically, the second bearing 54 is arranged between the large-diameter tubular portion 52a of the planetary rotary body 52 and the eccentric inner peripheral surface 51a1 of the large-diameter tubular portion 51a of the eccentric member 51.

The second bearing 54 is formed of a deep-groove ball bearing comprising an outer ring 54a, an inner ring 54b, and rolling elements 54c (balls). The outer ring 54a of the second bearing 54 is fixed (press-fitted) to the eccentric inner peripheral surface 51a1 of the large-diameter tubular portion 51a of the eccentric member 51. The inner ring 54b of the second bearing 54 is fixed (press-fitted) to the outer peripheral surface of the large-diameter tubular portion 52a of the planetary rotary body 52.

The second bearing 54 is arranged astride the speed reducers 5a and 5b so as to support both of the first speed reducer 5a and the second speed reducer 5b. That is, the second bearing 54 is arranged between the eccentric member 51 and the planetary rotary body 52 so as to overlap a part of the first speed reducer 5a in the axial direction and overlap a part of the second speed reducer 5b in the axial direction. As illustrated in FIG. 3, a length D1 of an overlap between the second bearing 54 and the first speed reducer 5a is larger than a length D2 of an overlap between the second bearing 54 and the second speed reducer 5b.

Figure 8:
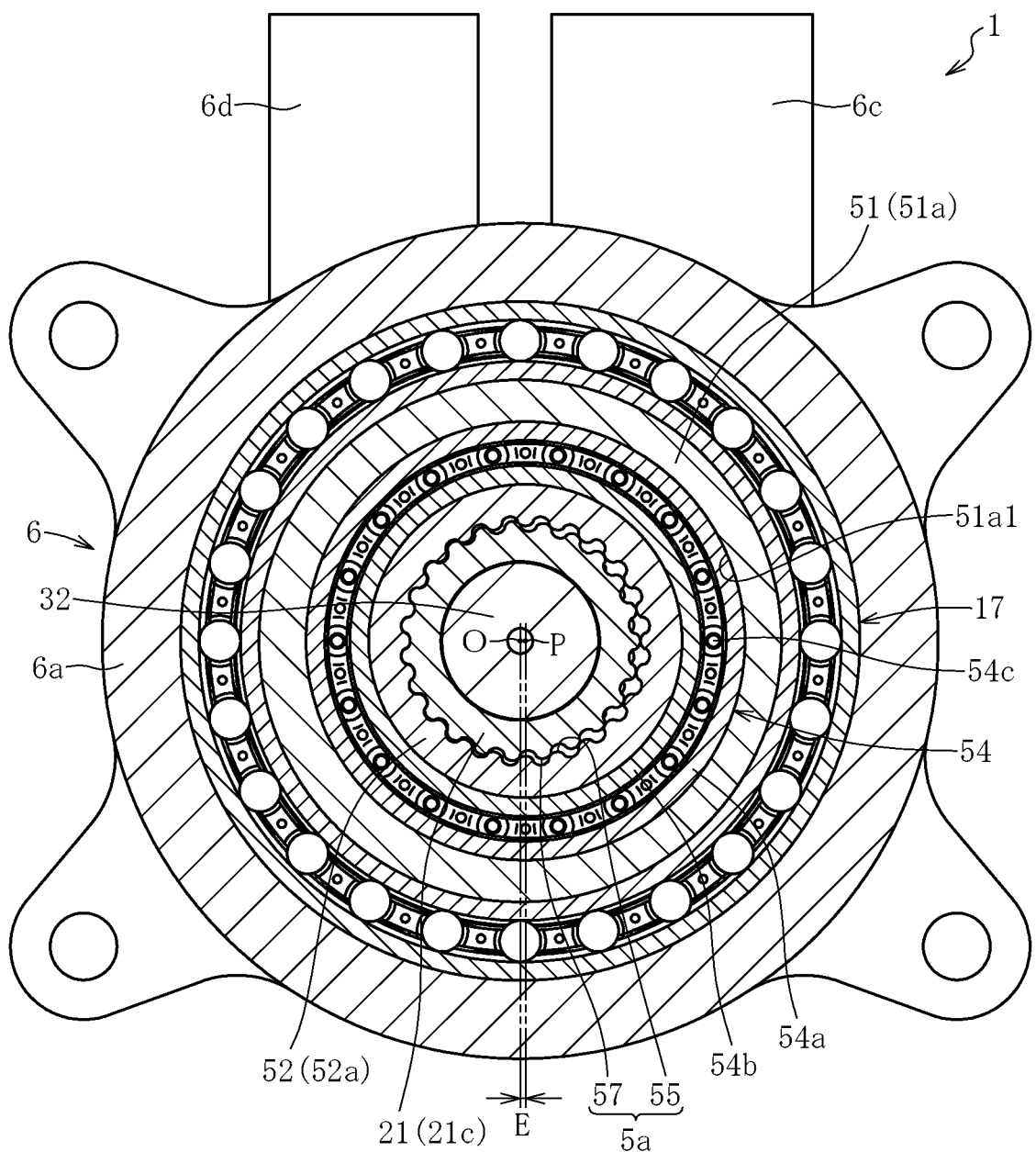
FIG. 8 is a sectional view taken along the line A-A of FIG. 1 and viewed from the direction indicated by the arrows.
Figure 9:
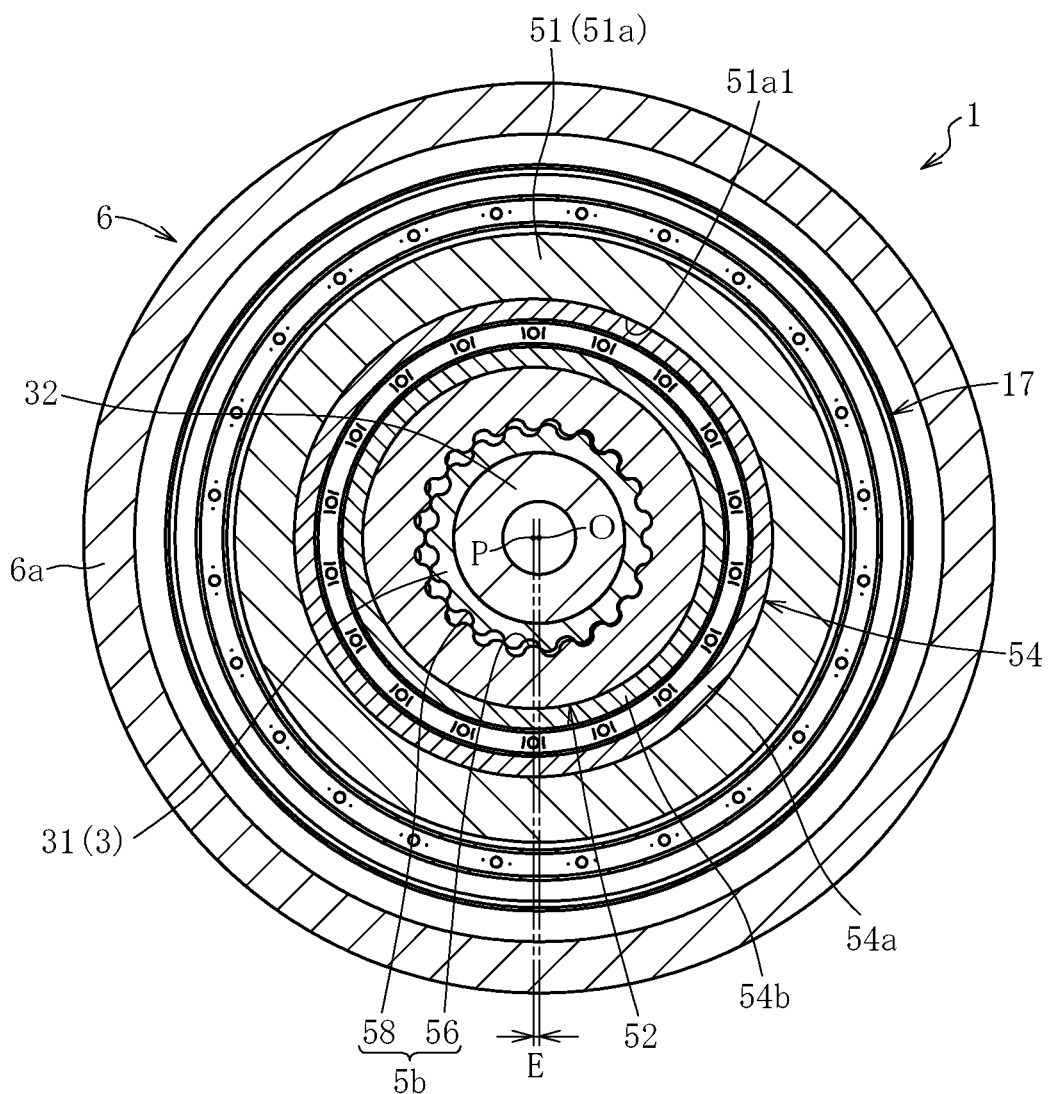
FIG. 9 is a sectional view taken along the line B-B of FIG. 1 and viewed from the direction indicated by the arrows.

FIG. 8 is a sectional view taken at a position of the first speed reducer 5a (sectional view taken along the line A-A of FIG. 1 and viewed from the direction indicated by the arrows). FIG. 9 is a sectional view taken at a position of the second speed reducer 5b (sectional view taken along the line B-B of FIG. 1 and viewed from the direction indicated by the arrows).

As illustrated in FIG. 8, the center P of the first inner tooth portions 55 is eccentric by a length E in the radial direction with respect to the rotation axis O. Thus, the first inner tooth portions 55 and the first outer tooth portions 57 are in a state of meshing with each other in a partial circumferential region while not meshing with each other in a region radially opposite to the partial circumferential region. Further, as illustrated in FIG. 9, the center P of the second inner tooth portions 56 is also eccentric by the length E in the radial direction with respect to the rotation axis O. Thus, the second inner tooth portions 56 and the second outer tooth portions 58 are in a state of meshing with each other in a partial circumferential region while not meshing with each other in a region radially opposite to the partial circumferential region. In FIG. 8 and FIG. 9, directions of the arrows are different from each other, and hence respective eccentric directions of the first inner tooth portions 55 and the second inner tooth portions are illustrated as being opposite to each other in the right-and-left direction in FIG. 8 and FIG. 9. However, the first inner tooth portions 55 and the second inner tooth portions 56 are eccentric by the same length E in the same direction.

Here, when a speed reduction ratio of the differential device 5 is "i", a motor rotation speed is "nm", and a rotation speed of the sprocket 22 is "ns", an output rotation phase angle difference is determined by (nm−ns)/i.

Further, when the speed reduction ratio of the first speed reducer 5a is "i1", and the speed reduction ratio of the second speed reducer 5b is "i2", the speed reduction ratio by the differential device 5 of this embodiment can be determined by Expression 1 described below.

$$\text{Speed reduction ratio} = i1 \times i2/|i1-i2| \quad \text{Expression 1}$$

For example, when the speed reduction ratio (i1) of the first speed reducer 5a is 24/23, and the speed reduction ratio (i2) of the second speed reducer 5b is 20/19, the speed reduction ratio is 120 based on Expression 1 described above. As described above, in the differential device 5 of this embodiment, high torque can be obtained with a large speed reduction ratio.

In the electric actuator 1 according to this embodiment, the driving rotary body 2 and the driven rotary body 3 are arranged on a radially inner side of the planetary rotary body 52. Accordingly, a hollow motor is adopted as the electric motor 4 configured to drive the planetary rotary body 52, and there is adopted a layout in which the hollow motor is arranged on a radially outer side of the planetary rotary body 52. Thus, space efficiency is satisfactory, and hence there can be obtained an advantage that downsizing of the electric actuator 1 (in particular, downsizing in axial dimension) can be achieved.

Further, in the electric actuator 1 according to this embodiment, the needle roller bearing is adopted as the first bearing 53 on a radially inner side of the rotor 42. Accordingly, a radial dimension of the electric actuator 1 can be reduced as much as possible. In addition, the deep-groove ball bearing serving as the second bearing 54 is arranged at the position shifted in the axial direction so as to be prevented from overlapping the rotor core 42a. Thus, while preventing an increase in radial dimension, rigidity of the first speed reducer 5a and the second speed reducer 5b is increased as much as possible, and skew that occurs in the planetary rotary body 52 is suppressed, thereby being capable of preventing reduction in efficiency of the electric actuator 1.

Next, with reference to FIG. 1 to FIG. 10, description is made of an operation of the electric actuator according to this embodiment.

During an operation of the engine, the driving rotary body 2 is rotated by the drive force transmitted to the sprocket 22 from the engine.

Under a state in which the electric motor 4 is not energized and a force is not input from the electric motor 4 to the differential device 5, rotation of the driving rotary body 2 is transmitted to the driven rotary body 3 via the planetary rotary body 52 so that the driven rotary body 3 rotates integrally with the driving rotary body 2. That is, through torque transmission in meshing portions between the first inner tooth portions 55 and the first outer tooth portions 57, the driving rotary body 2 and the planetary rotary body 52 rotate integrally with each other while maintaining the meshing state. Similarly, the planetary rotary body 52 and the driven rotary body 3 also rotate integrally with each other while maintaining meshing positions between the second inner tooth portions 56 and the second outer tooth portions 58. Accordingly, the driving rotary body 2 and the driven rotary body 3 rotate while keeping the same rotation phase.

After that, when the engine is shifted to a low-rotation range such as idle driving, the electric motor 4 is energized, and the rotor 42 is rotated relatively slower or faster than the rotation number of the sprocket 22 by publicly-known means, for example, electronic control. When the electric motor 4 is operated, the eccentric member 51 coupled to the rotor core 42a of the rotor 42 integrally rotates about the rotation axis O. Along with this, a pressing force generated along with rotation of the eccentric member 51 comprising the thin portion and the thick portion is applied to the planetary rotary body 52 via the first bearing 53. The pressing force generates a component force in the circumferential direction in the meshing portions between the first inner tooth portions 55 and the first outer tooth portions 57, and hence the planetary rotary body 52 performs an eccentric rotary motion relative to the driving rotary body 2. That is, while revolving about the rotation axis O, the planetary rotary body 52 rotates about the center P of the first inner tooth portions 55 and the second inner tooth portions 56. In this case, after every one revolution of the planetary rotary body 52, meshing positions between the first inner tooth portions 55 and the first outer tooth portions 57 are shifted in the circumferential direction by one tooth, and hence the planetary rotary body 52 rotates (rotates on its axis) while being reduced in speed.

Figure 10:
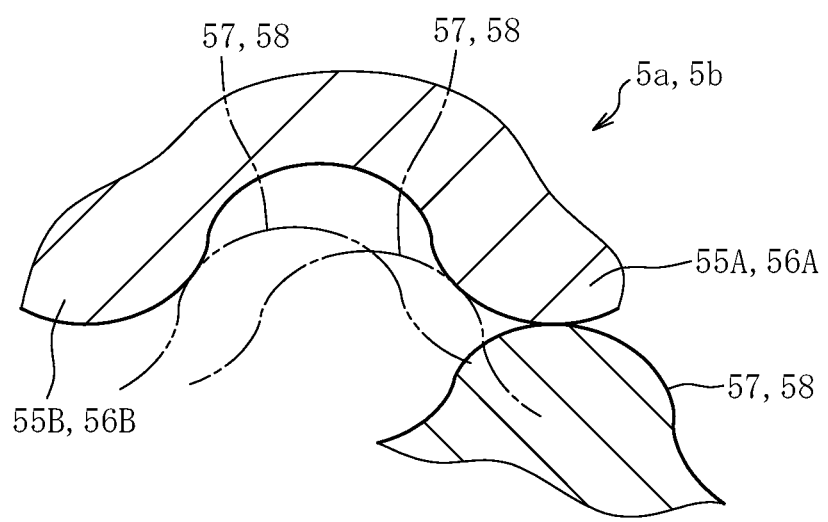
FIG. 10 is a sectional view for illustrating a progress process of meshing between the inner tooth portion and the outer tooth portion of a speed reducer.

FIG. 10 is a sectional view for illustrating a progress process of meshing between the first inner tooth portion 55 and the first outer tooth portion 57 during the operation of the electric motor 4. When the planetary rotary body 52 rotates on its axis while revolving as described above, the tooth surface of the first inner tooth portion 55 and the tooth surface of the first outer tooth portion 57 relatively move while sliding (while performing a sliding motion) under a contact state. The first outer tooth portion 57 relatively moves from a position indicated by the solid line of FIG. 10 at which the first outer tooth portion 57 is held in contact with a first inner tooth portion 55A, to a position indicated by the dot-and-dash line of FIG. 10 while maintaining contact with the first inner tooth portion 55A. After that, the first outer tooth portion 57 moves away from the first inner tooth portion 55A with which the first outer tooth portion 57 has been held in contact, and comes into contact with a next first inner tooth portion 55B as indicated by the dot-dot-dash line of FIG. 10. The first outer tooth portion 57 repeats the same movements.

Further, when the planetary rotary body 52 performs the eccentric rotary motion described above, after every one revolution of the planetary rotary body 52, the meshing positions between the second inner tooth portions 56 and the second outer tooth portions 58 are shifted in the circumferential direction by one tooth. With this, the driven rotary body 3 rotates while being reduced in speed with respect to the planetary rotary body 52. As described above, when the planetary rotary body 52 is driven by the electric motor 4, the drive force from the electric motor 4 is superimposed on the drive force from the sprocket 22, and rotation of the driven rotary body 3 is brought into a differential state of being subjected to the drive force from the electric motor 4. Accordingly, a relative rotation phase difference of the driven rotary body 3 with respect to the driving rotary body 2 can be changed in a forward or reverse direction, and an opening/closing timing of a valve produced by a cam of the cam shaft 32 can be changed in an advance direction or a retard direction. Relative movement (progress process of meshing) between the tooth surface of the second inner tooth portion 56 (56A, 56B) and the tooth surface of the second outer tooth portion 58 is performed in the same manner as that in the case of the first inner tooth portion 55 (55A, 55B) and the first outer tooth portion 57 described with reference to FIG. 10.

When the opening/closing timing of the valve is changed as described above, stability of rotation and fuel efficiency of the engine during the idle driving can be improved. Further, when the operation of the engine is shifted from the idle state to a normal operation and, for example, brought into a high-speed rotation state, through increase in speed difference of relative rotation of the electric motor 4 with respect to the sprocket 22, the rotation phase difference of the cam shaft 32 with respect to the sprocket 22 can be changed to the rotation phase difference suitable for the high rotation, thereby being capable of achieving higher output of the engine.

As described above, in the electric actuator 1 according to this embodiment, the plurality of dimples 59 are formed in the tooth surfaces of the inner tooth portions 55 and the outer tooth portions 57 of the speed reducer 5a and the tooth surfaces of the inner tooth portions 56 and the outer tooth portions 58 of the speed reducer 5b. With this configuration, oil reservoirs for the lubricating oil are formed in the dimples 59 so that oil films are easily formed on the surfaces. Thus, through reduction in frictional force acting on the tooth surfaces configured to perform power transmission while sliding during the operation of the electric motor 4, the reduction in efficiency of the differential device 5 can be prevented. Further, through prevention of wear and seizure, a service life of the differential device can be prolonged. Further, as compared to a case in which coatings are formed on the surfaces by, for example, plating, abrasion of the coatings due to wear does not occur. Further, when the dimples 59 are formed in the raceway surface (outer peripheral surface 52b2) of the small-diameter tubular portion 52b of the planetary rotary body 52, wear and seizure of the raceway surface can be prevented effectively.

The present invention is not limited to the configuration of the above-mentioned embodiment. In addition, the action and effect of the present invention are not limited to those described above. The present invention may be modified in various forms within the range not departing from the spirit of the present invention.

In the embodiment described above, the first bearing 53 is exemplified as the needle roller bearing, but is not limited thereto. The first bearing 53 may be formed of another bearing such as a deep-groove ball bearing.

In the embodiment described above, description is made of the example in which the dimples 59 are formed in both of the inner tooth portions 55 and the outer tooth portions 57 and both of the inner tooth portions 56 and the outer tooth portions 58, but the present invention is not limited to this configuration. For example, the dimples 59 may be formed in only any one of the inner tooth portions 55 and the outer tooth portions 57 meshing with each other and in only any one of the inner tooth portions 56 and the outer tooth portions 58 meshing with each other.

REFERENCE SIGNS LIST 1 electric actuator
2 driving rotary body
3 driven rotary body
4 electric motor
5 differential device
5a first speed reducer
5b second speed reducer
22 sprocket
32 cam shaft
42 rotor
51 eccentric member
52 planetary rotary body
52b2 outer peripheral surface of planetary rotary body
53 first bearing (needle roller bearing)
53b rolling element
54 second bearing 54a outer ring of second bearing
54b inner ring of second bearing
55 first inner tooth portion
56 second inner tooth portion
57 first outer tooth portion
58 second outer tooth portion
59 dimple
O rotation axis

The invention claimed is:

1. An electric actuator, comprising:
a differential device comprising:
a driving rotary body rotatable about a rotation axis;
a planetary rotary body capable of rotating on its axis and revolving about the rotation axis;
a driven rotary body rotatable about the rotation axis, the planetary rotary body meshing with the driving rotary body and the driven rotary body;
a first speed reducer formed between the planetary rotary body and the driving rotary body; and
a second speed reducer formed between the planetary rotary body and the driven rotary body,
the first speed reducer and the second speed reducer having different speed reduction ratios;
an electric motor comprising a rotor configured to drive the planetary rotary body;
a first bearing configured to support the planetary rotary body on an inner side of the rotor; and
a second bearing configured to support the planetary rotary body at a position shifted in an axial direction so as to be prevented from overlapping the rotor,
wherein the second bearing is a deep-groove ball bearing,
wherein the first bearing comprises rolling elements that roll in contact with the planetary rotary body,
wherein the planetary rotary body has an outer peripheral surface on which the rolling elements roll in contact with the outer peripheral surface, and
wherein the outer peripheral surface of the planetary rotary body contacts the rolling elements on the inner side of the rotor.

2. The electric actuator according to claim 1, wherein the second bearing is configured to support both of the first speed reducer and the second speed reducer.

3. The electric actuator according to claim 2,
wherein the differential device further comprises an eccentric member configured to rotate integrally with the rotor and change a rotation phase difference of the driven rotary body with respect to the driving rotary body, and
wherein the second bearing comprises:
an outer ring fixed to an inner periphery of the eccentric member; and
an inner ring fixed to an outer periphery of the planetary rotary body.

4. The electric actuator according to claim 3, wherein the first bearing is a needle roller bearing.

5. The electric actuator according to claim 4, further comprising:
a sprocket provided to the driving rotary body; and
a cam shaft provided to the driven rotary body,
wherein the electric actuator is applied to a variable valve timing device configured to change an opening/closing timing of a valve by changing a rotation phase difference between the sprocket and the cam shaft.

6. The electric actuator according to claim 3, further comprising:
a sprocket provided to the driving rotary body; and
a cam shaft provided to the driven rotary body,
wherein the electric actuator is applied to a variable valve timing device configured to change an opening/closing timing of a valve by changing a rotation phase difference between the sprocket and the cam shaft.

7. The electric actuator according to claim 2, wherein the first bearing is a needle roller bearing.

8. The electric actuator according to claim 7, further comprising:
a sprocket provided to the driving rotary body; and
a cam shaft provided to the driven rotary body,
wherein the electric actuator is applied to a variable valve timing device configured to change an opening/closing timing of a valve by changing a rotation phase difference between the sprocket and the cam shaft.

9. The electric actuator according to claim 2, further comprising:
a sprocket provided to the driving rotary body; and
a cam shaft provided to the driven rotary body,
wherein the electric actuator is applied to a variable valve timing device configured to change an opening/closing timing of a valve by changing a rotation phase difference between the sprocket and the cam shaft.

10. The electric actuator according to claim 2,
wherein the first speed reducer comprises first inner tooth portions and first outer tooth portions meshing with each other,
wherein the second speed reducer comprises second inner tooth portions and second outer tooth portions meshing with each other,
wherein at least one of tooth surfaces of the first inner tooth portions and tooth surfaces of the first outer tooth portions have a plurality of dimples, and
wherein at least one of tooth surfaces of the second inner tooth portions and tooth surfaces of the second outer tooth portions have a plurality of dimples.

11. The electric actuator according to claim 1, wherein the first bearing is a needle roller bearing.

12. The electric actuator according to claim 11,
wherein the outer peripheral surface of the planetary rotary body has a plurality of dimples.

13. The electric actuator according to claim 11, further comprising:
a sprocket provided to the driving rotary body; and
a cam shaft provided to the driven rotary body,
wherein the electric actuator is applied to a variable valve timing device configured to change an opening/closing timing of a valve by changing a rotation phase difference between the sprocket and the cam shaft.

14. The electric actuator according to claim 1, further comprising:
a sprocket provided to the driving rotary body; and
a cam shaft provided to the driven rotary body,
wherein the electric actuator is applied to a variable valve timing device configured to change an opening/closing timing of a valve by changing a rotation phase difference between the sprocket and the cam shaft.

15. The electric actuator according to claim 1,
wherein the first speed reducer comprises first inner tooth portions and first outer tooth portions meshing with each other,
wherein the second speed reducer comprises second inner tooth portions and second outer tooth portions meshing with each other,
wherein at least one of tooth surfaces of the first inner tooth portions and tooth surfaces of the first outer tooth portions have a plurality of dimples, and wherein at least one of tooth surfaces of the second inner tooth portions and tooth surfaces of the second outer tooth portions have a plurality of dimples.

16. The electric actuator according to claim 15, further comprising:
a cam shaft provided to the driven rotary body,
wherein the driving rotary body comprises a sprocket, and
wherein the electric actuator is applied to a variable valve timing device configured to change an opening/closing timing of a valve by changing a rotation phase difference of the cam shaft with respect to the sprocket.

17. An electric actuator, comprising:
a differential device comprising:
  a driving rotary body rotatable about a rotation axis;
  a planetary rotary body capable of rotating on its axis and revolving about the rotation axis;
  a driven rotary body rotatable about the rotation axis, the planetary rotary body meshing with the driving rotary body and the driven rotary body;
  a first speed reducer formed between the planetary rotary body and the driving rotary body; and
  a second speed reducer formed between the planetary rotary body and the driven rotary body,
    the first speed reducer and the second speed reducer having different speed reduction ratios;
an electric motor comprising a rotor configured to drive the planetary rotary body;
a first bearing configured to support the planetary rotary body on an inner side of the rotor; and
a second bearing configured to support the planetary rotary body at a position shifted in an axial direction so as to be prevented from overlapping the rotor,
wherein the differential device further comprises an eccentric member configured to rotate integrally with the rotor and change a rotation phase difference of the driven rotary body with respect to the driving rotary body,
wherein the second bearing is a deep-groove ball bearing, and
wherein the second bearing comprises:
  an outer ring fixed to an inner periphery of the eccentric member; and
  an inner ring fixed to an outer periphery of the planetary rotary body.

18. The electric actuator according to claim 17, wherein the first bearing is a needle roller bearing.

19. The electric actuator according to claim 18, further comprising:
a sprocket provided to the driving rotary body; and
a cam shaft provided to the driven rotary body,
wherein the electric actuator is applied to a variable valve timing device configured to change an opening/closing timing of a valve by changing a rotation phase difference between the sprocket and the cam shaft.

20. The electric actuator according to claim 17, further comprising:
a sprocket provided to the driving rotary body; and
a cam shaft provided to the driven rotary body,
wherein the electric actuator is applied to a variable valve timing device configured to change an opening/closing timing of a valve by changing a rotation phase difference between the sprocket and the cam shaft.

* * * * *